Feb. 3, 1931.                H. R. RICARDO                 1,790,766
                MOUNTING OF ENGINES AND OTHER ROTARY MACHINES
                            Filed June 8, 1929
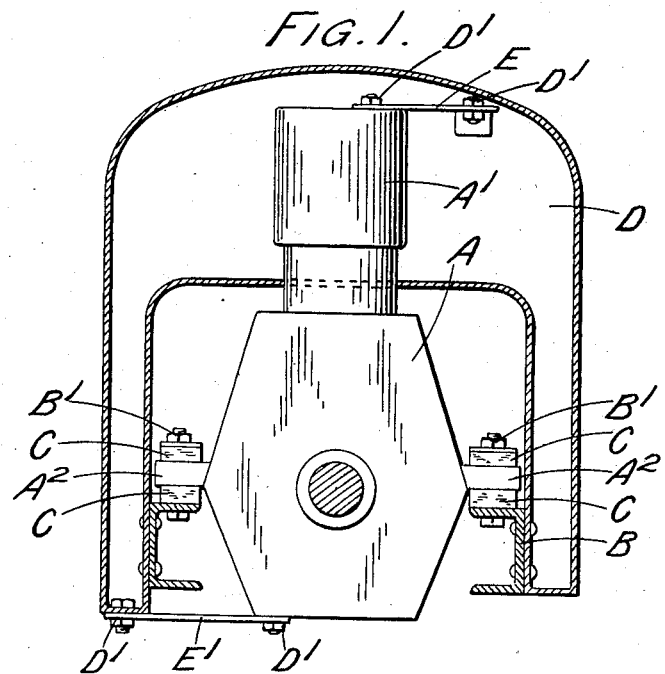
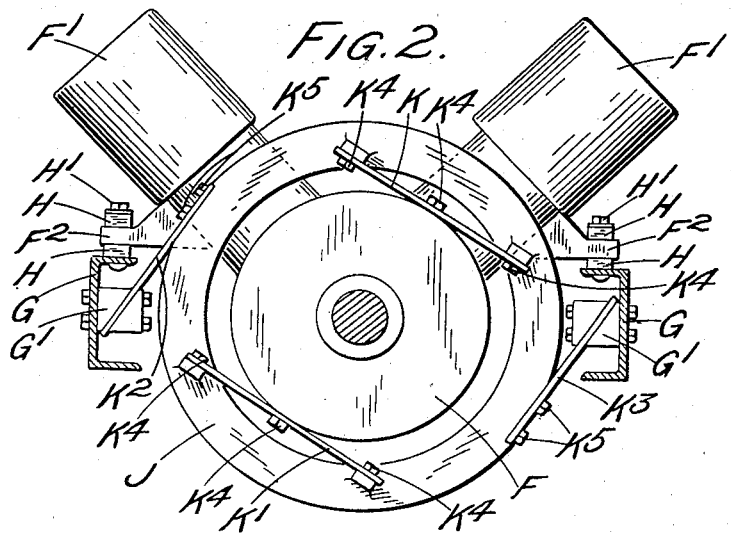
Inventor
Harry Ralph Ricardo
Per
Watson, Coit, Morse & Grindle Att'y Patented Feb. 3, 1931

1,790,766

UNITED STATES PATENT OFFICE

HARRY RALPH RICARDO, OF LONDON, ENGLAND

MOUNTING OF ENGINES AND OTHER ROTARY MACHINES

Application filed June 8, 1929, Serial No. 369,514, and in Great Britain July 19, 1928.

This invention relates to the mounting of engines and other rotary machines of the kind in which the engine or machine is resiliently supported for example by means of springs, rubber blocks or the like on its bed for the purpose of preventing or reducing the transmission of vibration from the engine to such bed and is particularly but not exclusively applicable to the mounting of internal combustion engines on the chassis of motor road vehicles.

While known resilient mountings of this type have proved successful in reducing or preventing the transmission to the bed of vibration due to the inertia of moving parts of the engine, for example the secondary forces in a four-cylinder internal combustion engine, they permit to the engine or machine freedom to rock under the action of irregular torque transmitted thereby or therethrough with the result that, particularly at slow speeds where the torque impulses are usually greater there may be imparted to the bed a "shudder" which is considerably more pronounced than that produced under similar circumstances with a rigidly supported engine.

Even at high speeds the amplitude of the vibration which the inertia forces can impart to the engine as a whole is small so that while it is on the one hand possible and desirable for the purpose of reducing as far as practicable the transmission of such vibration to the engine bed, to employ mountings of considerable resilience, the degree of such resilience is on the other hand limited by the amount of angular movement of the engine under the action of torque variations which can be tolerated.

Thus, the position has previously been that with a rigid mounting for the engine, the bed has been subjected to vibration due to the inertia of the moving parts of the engine such vibration becoming acute at high speeds, while with resilient mountings the bed has been subjected, particularly at slow speeds, to vibrations due to torque variations, and it is the object of the present invention to provide a mounting in which neither of the above drawbacks will be present to any considerable extent.

According to the present invention the engine or other rotary machine is resiliently supported on a vehicle chassis or other bed in a manner permitting it a limited freedom of translational movement relatively thereto in one or more directions, while a positive connection is provided between the engine and the bed or a member rigidly connected thereto such as to permit the translational movement but to prevent relative angular movement between the bed and the engine due to variations in torque transmitted by or through the latter.

Preferably the positive connection between the engine and bed is in the form of one or more links or strips of spring metal so connecting the engine or machine to the bed or a member rigidly mounted thereon as to act in effect as torque rods preventing angular movement of the engine due to torque variations but permitting translational movements in the desired direction or directions. Thus two such links or strips may be connected to the engine at points widely spaced apart and arranged parallel to one another so as to constitute in effect a parallel link motion.

Further when the invention is applied to an engine or machine mounted upon bearers such as vehicle frame members, the positive connection between the engine and such bearers is preferably such as not to impose upon such bearers appreciable twisting stresses.

Alternatively one or more cross frame members may extend between such bearers so as to tend to prevent twisting thereof due to the action thereon of the members preventing angular movement of the engine.

The invention may be applied to engines and machines of various types and for various purposes, but two arrangements according to the invention as applied to internal combustion engines are illustrated somewhat diagrammatically by way of example in the accompanying drawings, in which—

Figure 1 is an end view showing the invention as applied to an internal combustion engine having a single row of cylinders, and
Figure 2 is a similar view to Figure 1 showing the invention as applied to an internal combustion engine having two rows of cylinders arranged at an angle to one another.

In the construction shown in Figure 1, the engine A which is supported on the frame members B of a motor road vehicle is of the type having a single row of vertically arranged cylinders $A^1$ and in this case the forces produced by the inertia of the moving parts are almost entirely in the vertical plane so that only vertical movement of the engine A relatively to the frame members B need be permitted.

The engine A is resiliently supported on the frame members B in known manner by rubber blocks or springs C disposed above and below lugs $A_2$ on the engine through which pass freely bolts $B^1$ connecting these lugs to the frame members B. The frame members B are rigidly connected together by a stout arched member D which may conveniently be in the form of and constitute a dashboard, this arched member tending to prevent twisting of the frame members. Connecting the engine A to this arched member D are two horizontally arranged links E, $E^1$ one of which, E, is connected to the head of one of the cylinders $A^1$, while the other is connected to the base of the crank case. The links E, $E^1$ may be pivoted respectively to the engine A and to the arched member D, but preferably are, as shown, in the form of strips of spring steel or the like rigidly secured at their ends, for example, by bolts $D^1$ to the engine and the arched member. Since the vertical movement of the engine relatively to the frame which is to be permitted is slight, the resilience of the strips E is sufficient to permit such vertical movement and such an arrangement removes the possibility of play at the ends of the strips and the necessity for lubrication.

It will be seen that with the arrangement shown in Figure 1, the links E, $E^1$, while permitting translational movement of the engine A relatively to the frame members B in a vertical plane so as to absorb vibration due to the inertia of the moving parts, will not permit appreciable angular movement of the engine A relatively to the frame members B due to the torque transmitted by the engine.

In the construction shown in Figure 2, the engine F is of the V-type having two rows of cylinders $F^1$ arranged at an angle to one another. In engines of this type both horizontal and vertical forces exist due to the inertia of the moving parts and it is thus desirable to permit to the engine translational movement in all planes but to prevent angular movement thereof relatively to its supporting frame. To this end, the engine is resiliently supported on the frame members G in a similar manner to the engine shown in Figure 1. Thus rubber blocks H are arranged above and below the supporting lugs $F^2$ of the engine through which pass freely bolts $H^1$ connecting these lugs to the frame members G. Surrounding one end of the engine is an annular floating member J constituting an intermediate member which is connected by two parallel links K, $K^1$ to the engine F and by further links $K^2$, $K^3$ at right angles to the links K, $K^1$ to the frame members G.

The links K, $K^1$ are each connected at their ends to the intermediate member J and at their centre points to the engine by bolts $K^4$; while each of the links $K^2$, $K^3$ is connected at one end to the intermediate member J by bolts $K^5$ and at its other end to a block $G^1$ which is bolted to the adjacent frame member G at or near the centre of gravity of its cross-section. Alternatively, links pivotally connected at their ends respectively to the frame members and the intermediate member, and to the intermediate member and the engine, may be employed.

The arrangement shown in Figure 2 permits translational movement of the engine relatively to the frame members G in all directions, but prevents angular movement between the engine and the frame members due to torque. Further by connecting each of the links $K^2$, $K^3$ to the frame members G at or near the centre of gravity of the cross-section of the latter, the tendency for these links to cause twisting of the frame members is reduced.

It is to be understood that although the invention has been described with particular reference to the mounting of internal combustion engines on the frames of vehicles, it may be applied to the mountings of internal combustion or other rotary engines or machines either on vehicle frames or other beds and that the details of construction may be varied considerably without departing from this invention.

What I claim as my invention and desire to secure by Letters Patent is:—

1. The combination of an engine having a rotary driving shaft, a supporting bed for the engine, resilient supporting members between the engine and the bed permitting translational movement of the engine relatively to the bed, and at least one inextensible link connecting the engine to the bed, this link extending in a direction at right angles to that in which relative translational movement between the engine and bed is to be permitted, and tangentially with respect to a circle having for center the axis of rotation of the rotary driving shaft so as to allow to the engine translational movement relatively to its bed in at least one plane but positively to prevent angular movement of the engine relatively to the bed due to torque variations.

2. The combination of an engine having a rotary driving shaft, bearers supporting opposite sides of the engine, resilient supporting members between the engine and the bearers permitting translational movement of the engine relatively to the bearers, a cross frame member connecting the bearers so as to tend to prevent twisting thereof, and at least one link positively connected at its ends respectively to the engine at a point remote from the axis of the driving shaft and to the cross frame member, this link extending in a direction tangential to a circle having for center the axis of rotation of the driving shaft, and at right angles to the direction in which translational movement is to be permitted so as to permit such translational movement but to prevent angular movement of the engine relatively to the bearers due to torque variations.

3. The combination of a reciprocating engine including at least one row of cylinders and a rotary crankshaft, a supporting bed for the engine, resilient supporting members between the engine and the bed permitting translational movement of the engine relatively to the bed in the plane in which the axes of the cylinders lie, and at least one inextensible link positively connecting the engine to the bed, such link extending in a direction at right angles to the plane in which the axes of the cylinders lie and tangentially with respect to a circle having for center the axis of the crankshaft so as to allow to the engine the desired translational movement but positively to prevent angular movement of the engine relatively to the bed due to torque variations.

4. The combination of a reciprocating engine including a rotary crankshaft and at least one row of cylinders, bearers supporting opposite sides of the engine, resilient supporting members between the engine and the bearers permitting translational movement of the engine relatively to the bearers in the plane in which lie the axes of the cylinders, at least one cross frame member connecting the bearers so as to prevent twisting thereof and at least one link positively connected at its ends respectively to one of the engine cylinders and to the cross frame member, such link extending in a direction at right angles to the plane in which the axes of the cylinders lie and tangentially with respect to a circle having for center the axis of rotation of the crankshaft.

5. The combination of an engine having a rotary driving shaft, a supporting bed for the engine, resilient supporting members between the engine and the bed permitting translational movement of the engine relatively to the bed, and at least one flexible metal strip rigidly connected at its ends respectively to the engine and bed and extending in a direction at right angles to that in which relative translational movement between the engine and bed is to be permitted and tangentially with respect to a circle having for center the axis of rotation of the rotary driving shaft so as to permit the desired relative translational movement but positively to prevent angular movement of the engine relatively to the bed due to torque variations.

6. The combination of an engine having a rotary driving shaft, bearers supporting the opposite sides of the engine, resilient supporting members between the engine and the bearers permitting translational movement of the engine relatively to the bearers, a cross frame member connecting the bearers, and at least one flexible metal strip rigidly connected at its ends respectively to the engine and to the cross frame member, such strip extending in a direction at right angles to that in which relative translational movement is to be permitted and tangentially with respect to a circle having for center the axis of the driving shaft so as to permit to the engine relative translational movement in the desired direction but positively to prevent angular movement of the engine relatively to the bearers due to torque variations.

7. The combination of a reciprocating engine including at least one row of cylinders and a rotary crankshaft, bearers supporting opposite sides of the engine, resilient supporting members between the engine and the bearers permitting translational movement of the engine relatively to the bearers, a cross frame member connecting the bearers, and at least one flexible metal strip rigidly connected at its ends respectively to one of the engine cylinders and to the cross frame member, this strip extending in a direction at right angles to the plane in which the axes of the cylinders lie and tangentially with respect to a circle having for center the axis of the crankshaft so as to permit relative translational movement between the engine and the bearers in the plane in which the cylinder axes lie but positively to prevent relative angular movement between the engine and the bearers due to torque variations.

8. The combination of an engine having a rotary driving shaft, a supporting bed for the engine, resilient supporting members between the engine and the bed permitting translational movement of the engine relatively to the bed in at least two directions, an intermediate floating member between the engine and the supporting bed, at least one link arranged tangentially with respect to a circle having for center the axis of the driving shaft and positively connected at one end to the intermediate floating member and at its other end to the bed, and at least one additional link connecting the intermediate floating member to the engine, this link being arranged at an angle to the first link and tangentially with respect to a circle having for center the axis of rotation of the engine so that translational movement of the engine in all directions is permitted but angular movement thereof relatively to the bed due to torque variations is prevented.

9. The combination of a reciprocating engine including at least one row of cylinders and a rotary crankshaft, bearers supporting the opposite sides of the engine, resilient supporting members between the engine and the bearers permitting translational movement of the engine relatively to the bearers, an intermediate floating member between the engine and its bearers, two parallel links each arranged tangentially with respect to a circle having for center the axis of the crankshaft and connected at one end to the intermediate member and at its other end to one of the bearers, and two further links arranged at a substantial angle to the first links and tangentially with respect to a circle having for center the axis of rotation of the crankshaft, each of such further links being connected at one end to the engine and at its other end to the intermediate member so as to permit translational movement of the engine in all directions but to prevent angular movement thereof relatively to the bed due to torque variations.

10. The combination of a reciprocating engine having at least two rows of cylinders, bearers supporting opposite sides of the engine, resilient supporting members between the engine and the bearers permitting translational movement of the engine relatively to the bearers, an annular floating member disposed concentrically with respect to the axis of the crankshaft, two parallel links each arranged tangentially with respect to this annular member and positively connected at one end to one of the bearers and at its other end to the annular member, and two further parallel links disposed at a substantial angle to the first links and tangentially with respect to a circle having for center the axis of rotation of the crankshaft, the ends of each of these further links being connected to the annular member while an intermediate point in the length of each further link is connected to the engine so as to permit to the engine translational movement in any direction but positively to prevent angular movement of the engine relatively to the bearers due to torque variations.

In testimony whereof I have signed my name to this specification.

HARRY RALPH RICARDO.